United States Patent
Kim (10) Patent No.: US 9,183,715 B2
(45) Date of Patent: Nov. 10, 2015

(54) APPARATUS AND METHOD FOR CONTROLLING COLOR OF MASK OF MONITORING CAMERA

(75) Inventor: Jong Dae Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 1315 days.

(21) Appl. No.: 12/163,460

(22) Filed: Jun. 27, 2008

(65) Prior Publication Data

US 2009/0189980 A1    Jul. 30, 2009

(30) Foreign Application Priority Data

Jan. 24, 2008   (KR) .................. 10-2008-0007459

(51) Int. Cl.
    *H04N 7/18* (2006.01)
    *G08B 13/196* (2006.01)
    *H04N 5/232* (2006.01)

(52) U.S. Cl.
    CPC .... *G08B 13/19686* (2013.01); *G08B 13/19691* (2013.01); *H04N 5/232* (2013.01)

(58) Field of Classification Search
    CPC .............................. H04N 5/2351; G01J 3/0229
    USPC .................................................. 348/143, 161
    See application file for complete search history.

(56) References Cited

U.S. PATENT DOCUMENTS

| 4,737,847 A * | 4/1988 | Araki et al. ................. 348/161 |
| 2006/0206911 A1 | 9/2006 | Kim et al. |
| 2008/0012940 A1* | 1/2008 | Kanaoka et al. ............. 348/148 |
| 2010/0080458 A1* | 4/2010 | Yamada et al. .............. 382/167 |

FOREIGN PATENT DOCUMENTS

| GB | 2 429 131 A | 2/2007 |
| JP | 2001-069494 A | 3/2001 |
| JP | 2006-025061 | 1/2006 |
| JP | 2006-304250 A | 11/2006 |

* cited by examiner

*Primary Examiner* — Tonia L Dollinger
*Assistant Examiner* — Kishin G Belani
(74) *Attorney, Agent, or Firm* — Birch, Stewart, Kolasch & Birch, LLP (57) ABSTRACT

A method for controlling a monitoring camera, and which includes generating a mask image using a first mask color, synthesizing the mask image on a specific region of a camera image captured by the monitoring camera, detecting a brightness value of the camera image, determining a second mask color corresponding to the detected brightness value of the camera image, and changing the first mask color of the mask image synthesized on the camera image to the determined second mask color.

12 Claims, 10 Drawing Sheets

APPARATUS AND METHOD FOR CONTROLLING COLOR OF MASK OF MONITORING CAMERA

CROSS REFERENCE TO A RELATED APPLICATION

This non-provisional application claims priority under 35 U.S.C. §119(a) to Korea Patent Application No. 10-2008-7459 filed in Republic of Korea on Jan. 24, 2008, the entire contents of which are hereby incorporated by reference.

BACKGROUND OF THE INVENTION

1. Field of the Invention

The present application relates to an apparatus and method for controlling a color of a mask of a monitoring camera.

2. Description of the Related Art

Figure 1:
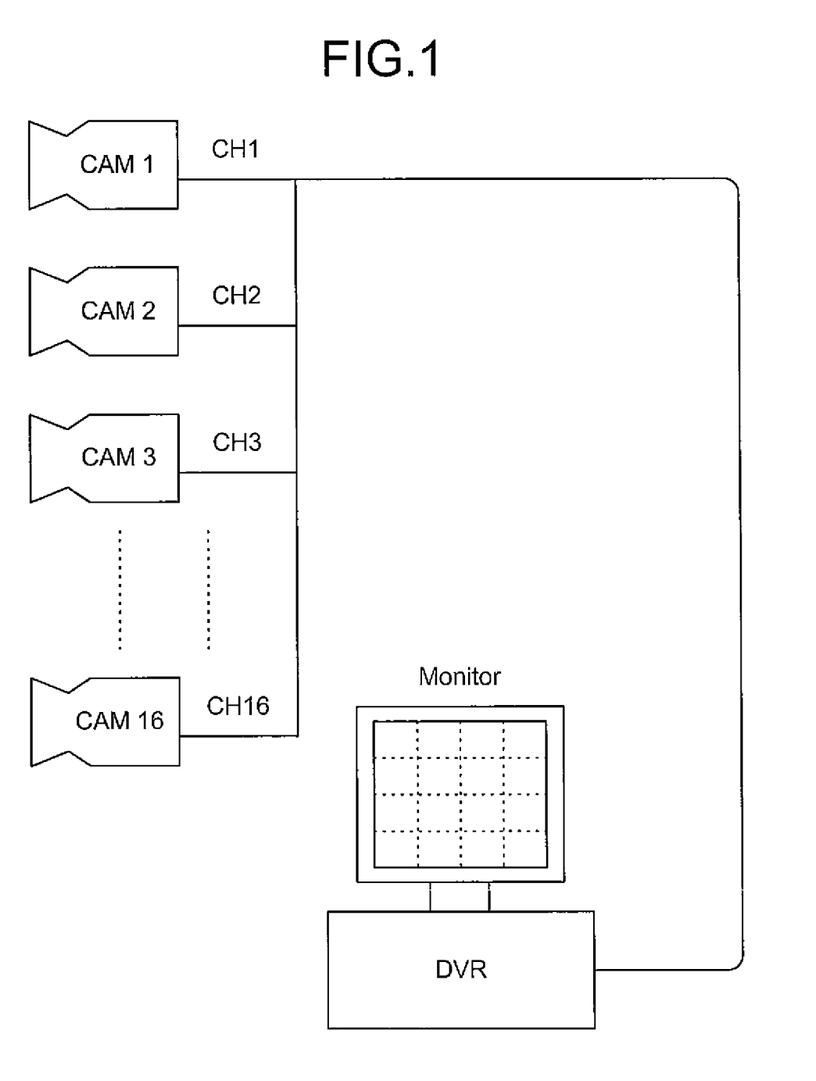
FIG. 1 is an overview illustrating a plurality of general monitoring cameras connected to a digital video recorder.

FIG. 1 illustrates an example in which a digital video recorder is connected to a plurality of monitoring cameras. In this example, sixteen monitoring cameras are connected to one digital video recorder (DVR). Further, camera images shot by the sixteen monitoring cameras may be written and stored in a hard disk HDD in the digital video recorder, or may be displayed on the screen of a monitor connected to the digital video recorder.

Figure 2:
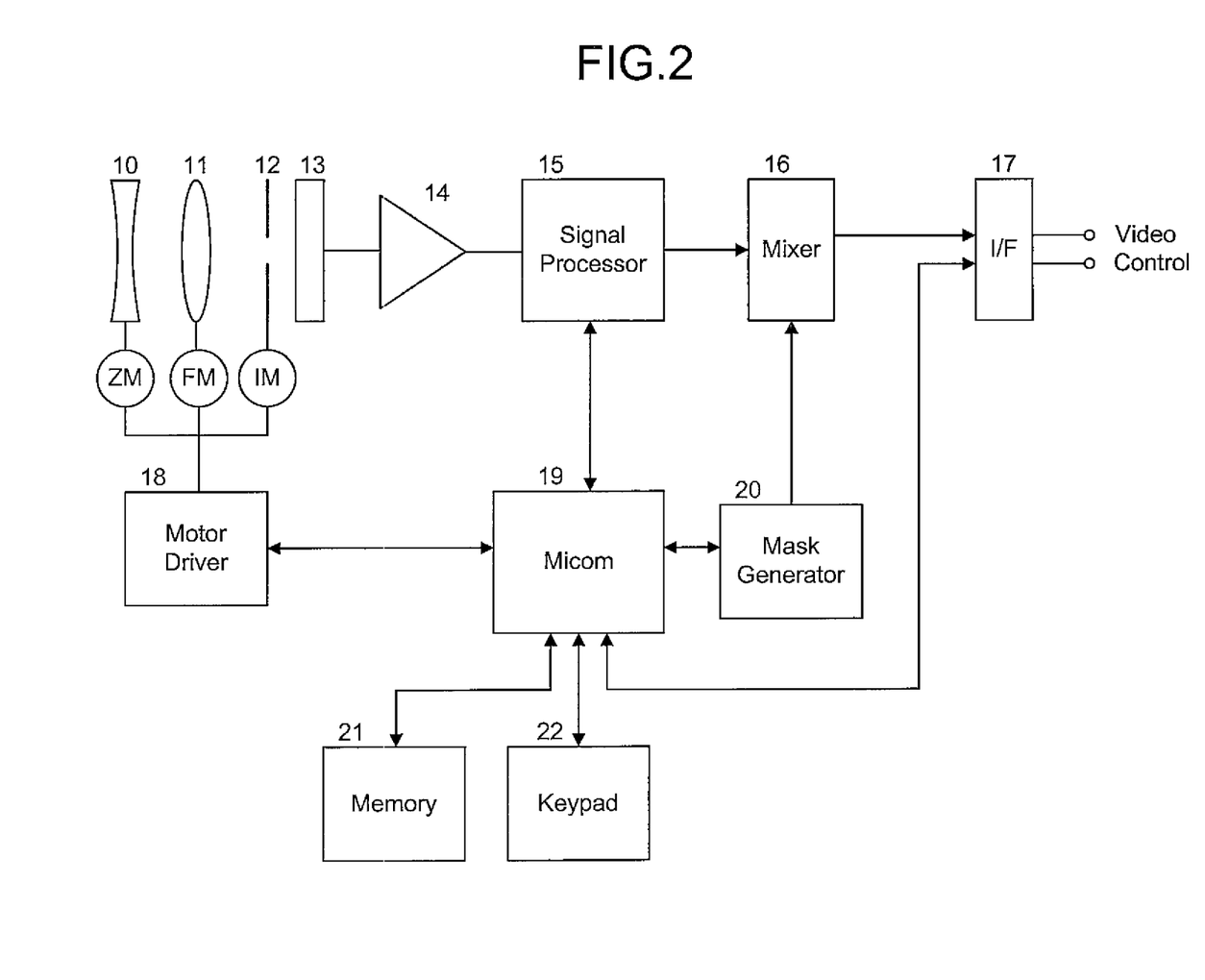
FIG. 2 is a block diagram illustrating a general monitoring camera.

FIG. 2 illustrates the construction of a general monitoring camera. For example, the monitoring camera includes a zoom lens 10, a focus lens 11, an iris 12, a CCD 13, an amplifier 14, a signal processor 15, a mixer 16, an interface 17, a motor driver 18, a microcomputer 19, a mask generator 20, a memory 21, a keypad 22, and so on.

In addition, the microcomputer 19 operatively controls the motor driver 18, the signal processor 15, and so on to output a camera image shot in real time to the digital video recorder DVR. Moreover, the microcomputer 19 operatively controls the mask generator 20 to generate and output a mask image of a certain shape and color, and the mixer 16 synthesizes the mask image on a specific region of the camera image, thereby preventing the specific region of the camera image from being visible. That is, the masked region is generally masked or covered to establish some privacy protection or the like from the captured image.

However, in a general monitoring camera, the color of a mask image synthesized on a specific region of a camera image is generated as a certain color set by a user. Thus, there is the problem that when the camera image is lightened or darkened, it is difficult or impossible to identify the camera image requiring privacy protection.

Further, there is the problem that even if an object motion occurs within a specific region of a camera image synthesized with a mask image, the user cannot see the corresponding object image and does not even know whether or not an object motion has occurred because the mask image is synthesized.

SUMMARY OF THE INVENTION

Accordingly, one object of the present invention is to address the above-noted and other problems.

Another object of the present invention is to provide an apparatus and method for controlling the color of a mask image of a monitoring camera, which synthesizes the mask image on a specific region of a camera image, automatically changes the color of the mask image according to the brightness of the camera image or change the color of the mask image according to a motion of an object detected from the camera image, and outputs a warning sound or warning message.

To achieve these and other advantages and in accordance with the purpose of the present invention, as embodied and broadly described herein, the present invention provides in one aspect a method for controlling a monitoring camera, and which includes generating a mask image using a first mask color, synthesizing the mask image on a specific region of a camera image captured by the monitoring camera, detecting a brightness value of the camera image, determining a second mask color corresponding to the detected brightness value of the camera image, and changing the first mask color of the mask image synthesized on the camera image to the determined second mask color. The present invention also provides a corresponding apparatus for controlling a monitoring camera.

In another aspect, the present invention provides a method for controlling a monitoring camera, and which includes generating a mask image using a first mask color, synthesizing the mask image on a specific region of a camera image captured by the monitoring camera, detecting an object motion from the camera image, and changing the first mask color of the mask image synthesized on the camera image into a second mask color if the detected object motion moves into an area defined by the mask image. The present invention also provides a corresponding apparatus for controlling a monitoring camera.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

An apparatus and method for controlling the color of a mask of a monitoring camera according to embodiments of the present invention are applicable to various types of monitoring cameras used to monitor a specific location.

Figure 3:
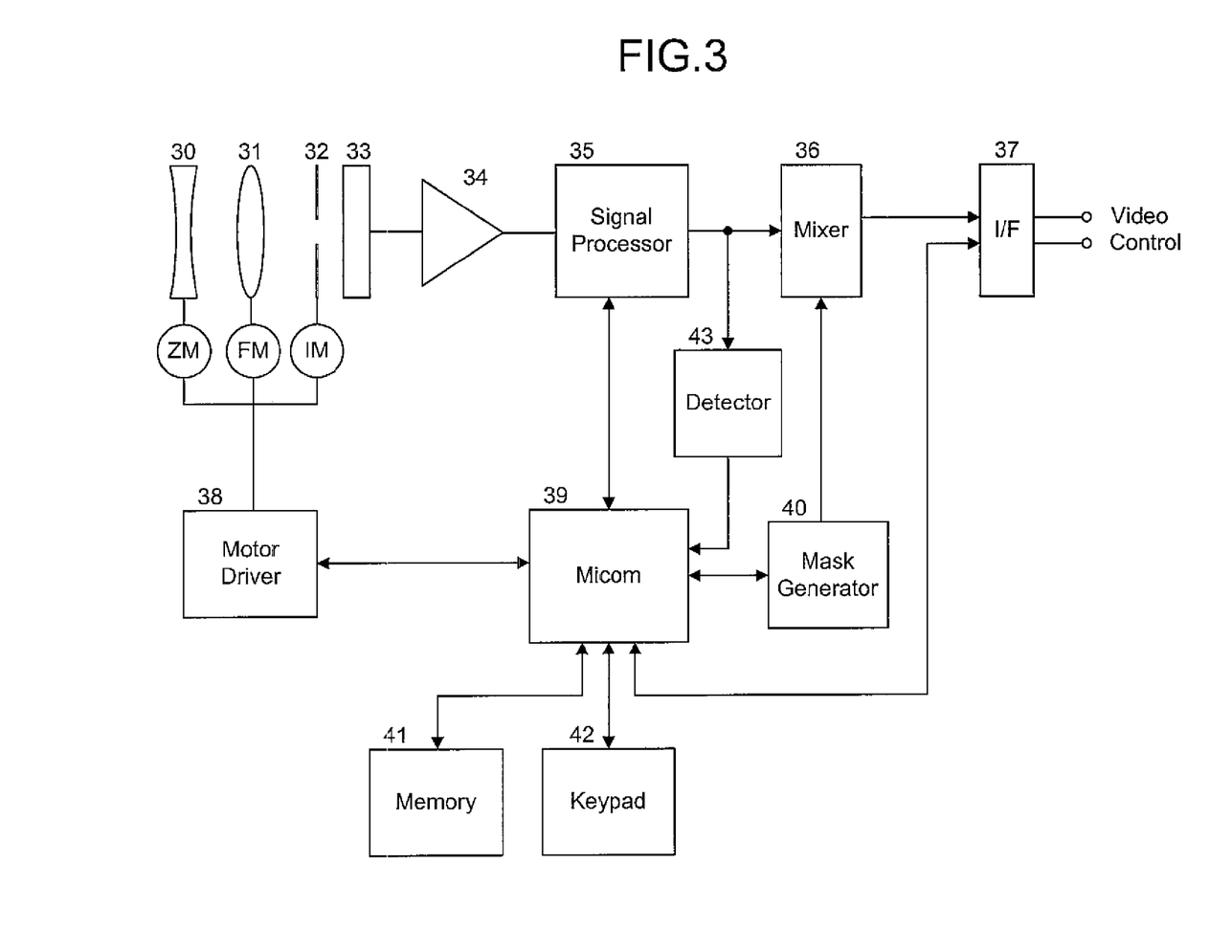
FIG. 3 is a block diagram illustrating a monitoring camera according to an embodiment of the present invention.

FIG. 3 is a block diagram illustrating a monitoring camera according to a first embodiment of the present invention. As shown, the monitoring camera includes a zoom lens 30, a focus lens 31, an iris 32, a CCD 33, an amplifier 34, a signal processor 35, a mixer 36, an interface 37, a motor driver 38, a microcomputer 39, a mask generator 40, a memory 41, a keypad 42, and so on.

The monitoring camera also includes a detector 43 for detecting the brightness of a camera image or detecting an object motion. For instance, in a first embodiment of the present invention, the detector 43 detects the brightness of a camera image, while in a second embodiment of the present invention, the detector 43 detects an object motion from a camera image.

Figure 4:
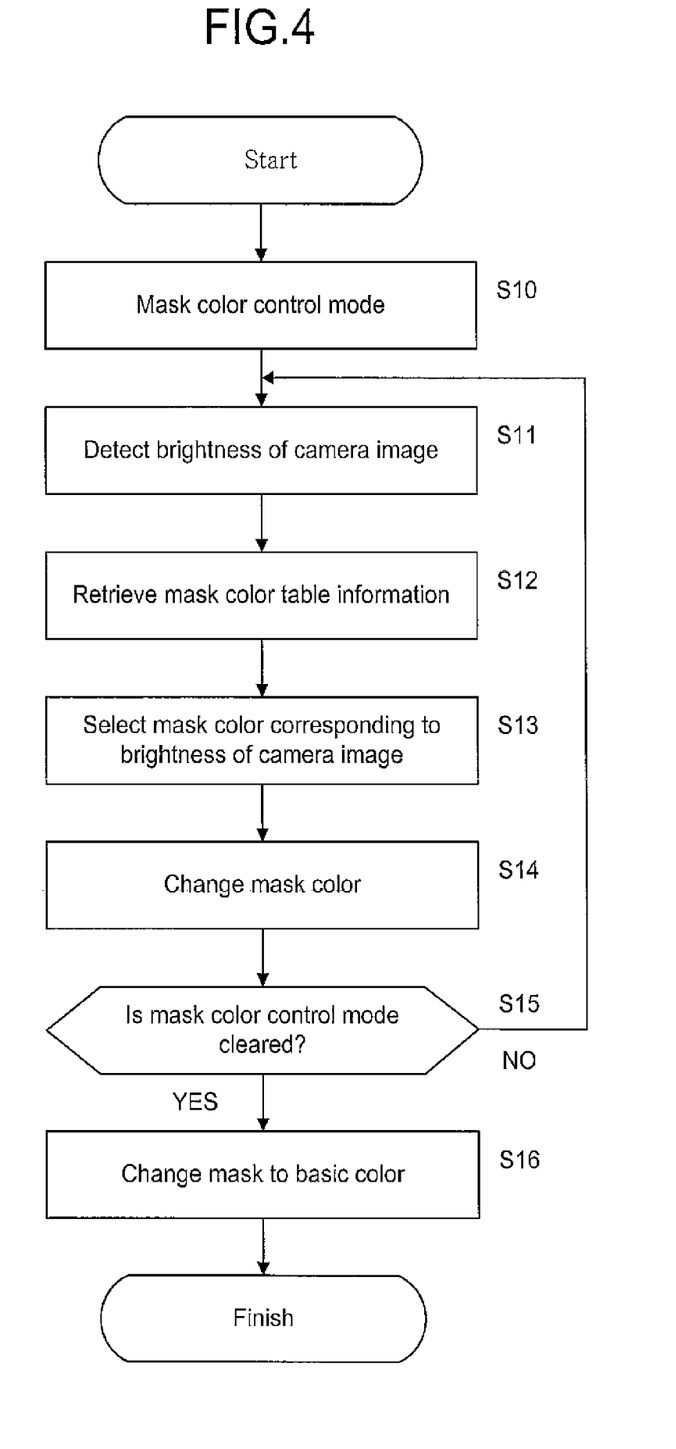
FIG. 4 is a flowchart illustrating a method for controlling a color of a mask of a monitoring camera according to a first embodiment of the present invention.

Next, FIG. 4 is a flowchart illustrating a method for controlling the color of a mask of a monitoring camera. FIG. 3 will also be referred to in this description. As shown in FIG. 4, the microcomputer 39 sets a mask color control mode according to a user's request or the like (S10).

The detector 43 then receives a camera image signal output through the signal processor 35 to detect a brightness (S11), for example, extracts a luminance component of the camera image signal to detect an average brightness value, and then outputs the average value to the microcomputer 39.

Further, the microcomputer 39 retrieves, for example, mask color table information stored and managed in the memory 41 (S12). The mask color table information has the brightness of a camera image and the corresponding optimum mask colors linked with each other as an experimental result value. The mask color table information is also preferably stored in a lookup table format.

In addition, the microcomputer 39 selects and retrieves a particular mask color corresponding to the brightness of the camera image signal within the mask color table information (S13), and operatively controls the mask generator 40 in accordance with the selected and retrieved mask color (S14).

Figure 5:
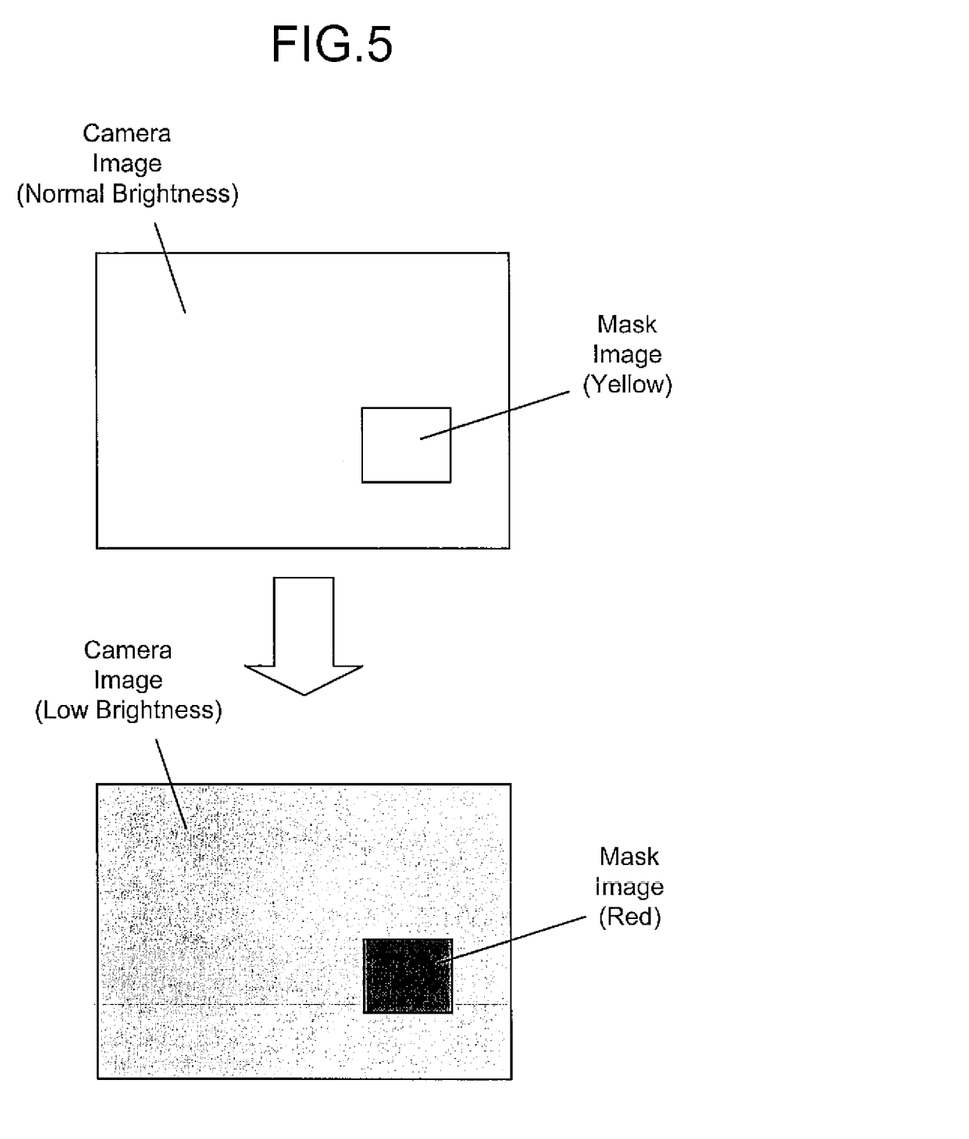
FIG. 5 is an overview illustrating changing a color of a mask according to the first embodiment of the present invention.

For instance, as illustrated in FIG. 5, when the brightness of the camera image is changed from a normal brightness to a low brightness, the microcomputer 39 changes the color of the mask image from yellow to red. Then, if the mask color control mode is cleared according to a user's request or the like (Yes in S15), the microcomputer 39 operatively controls the mask generator 20, and changes the color of the mask image to a previously set basic color (e.g., yellow) (S16).

Figure 6:
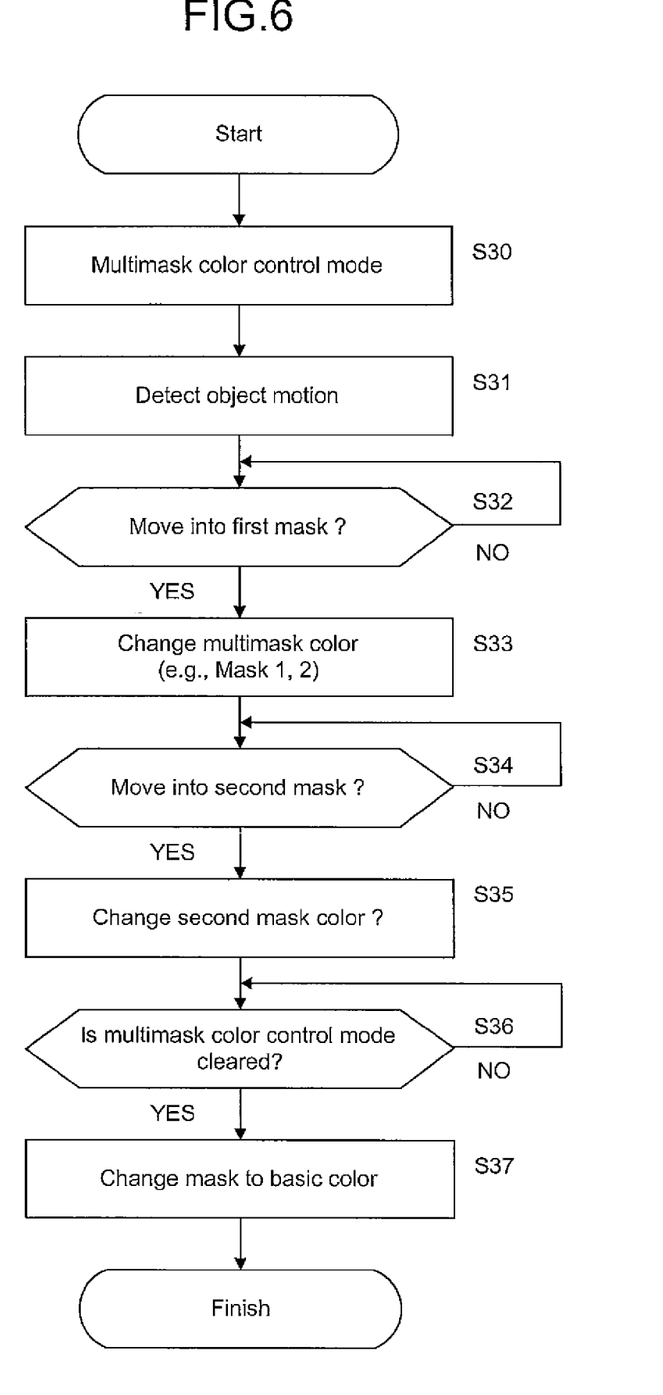
FIG. 6 is a flowchart illustrating a method for controlling a color of a mask of a monitoring camera according to a second embodiment of the present invention.

FIG. 6 is a flowchart illustrating a method for controlling a color of a mask of a monitoring camera according to a second embodiment of the present invention. FIG. 3 will also be referred to in this description.

As shown in FIG. 6, the microcomputer 39 sets, for example, a multi-mask color control mode according to a user's request or the like (S30). For example, the microcomputer 39 operatively controls the mask generator 40 to synthesize a first mask image of a large size and a second mask image of a small size on a camera image as illustrated in FIG. 7.

The detector 43 then receives a camera image signal output through the signal processor 35 and detects a motion of an object which is moved (S31). For example, a current video frame (n) in which an image signal is processed in real time and a video frame (n-1) in which an image signal has been previously processed are compared with each other to output a region in which an object motion is detected to the microcomputer 39.

Figure 7:
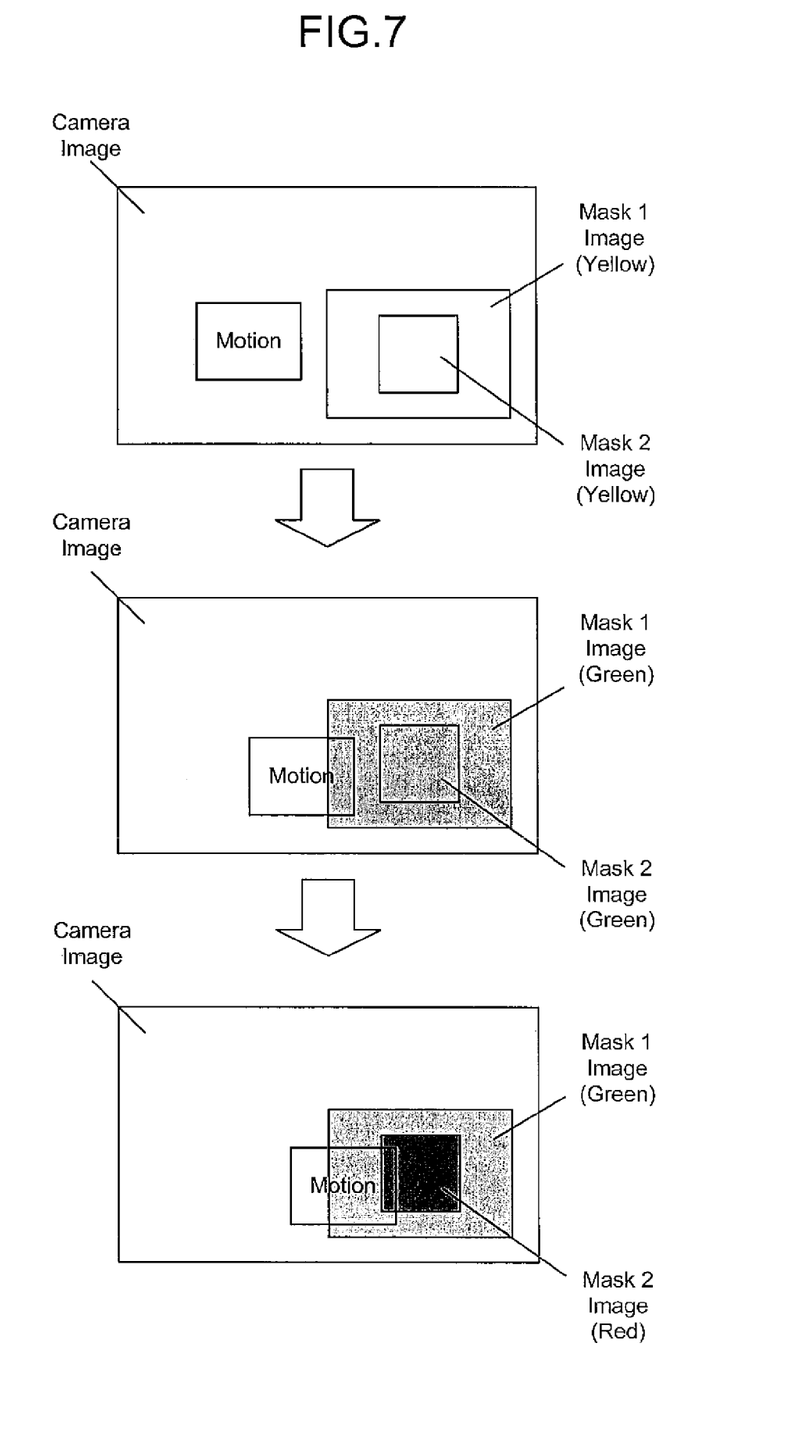
FIG. 7 is an overview illustrating changing a color of a mask according to the second embodiment of the present invention.

Further, the microcomputer 39 monitors, for example, as shown in FIG. 7, whether or not the region in which the object motion is detected moves into the first mask image, and as the result of monitoring, if it moves into the first mask image (S32), the microcomputer 39 operatively controls the mask generator 40 to change the colors of the first mask image and second mask image to colors different from the previous color (S33).

Moreover, the microcomputer 39 monitors whether the region in which the object motion is detected moves into the second mask image, and as the result of monitoring, if the object moves into the second mask image (Yes in S34), the microcomputer 39 operatively controls the mask generator 40 to change one or more of the colors of the first mask image and second mask image (S35).

For instance, as shown in FIG. 7, with the colors of both of the first and second mask images changed to green, if the object motion moves into the second mask image, the color of the second mask image only is changed from green to red, thereby allowing the user to easily recognize that the object has moved into the second mask image.

In addition, if the microcomputer 39 clears the multi-mask color control mode according to the user' request (Yes in S36), the colors of the first mask image and second mask image are changed to a previously set basic color (e.g., yellow) (S37).

Figure 8:
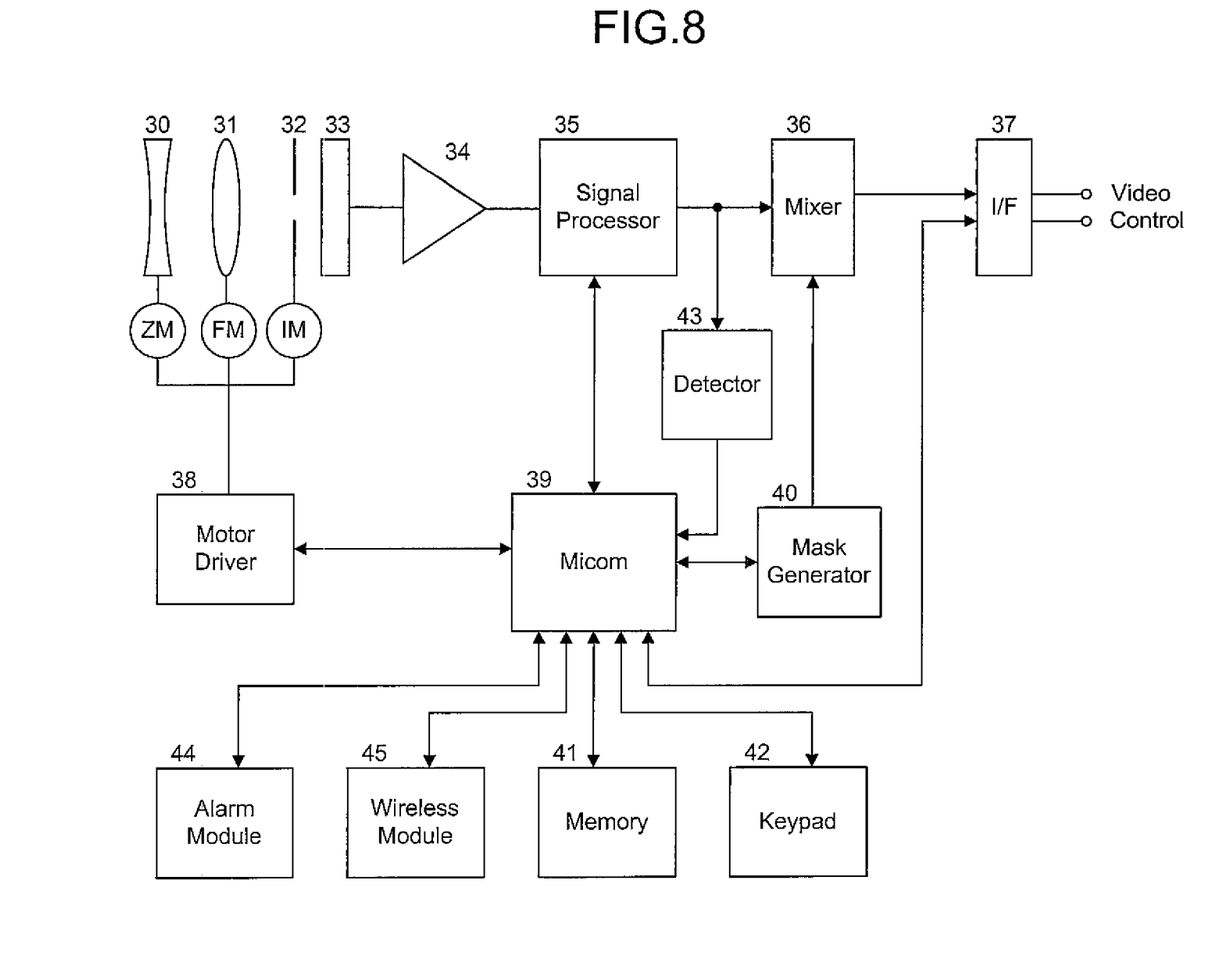
FIG. 8 is a block diagram illustrating a monitoring camera according to an embodiment of the present invention.

Next, FIG. 8 is a block diagram illustrating a monitoring camera according to an embodiment of the present invention. As shown, the monitoring camera includes similar components to that as shown in FIG.3 and also includes an alarm module 44 and a wireless module 45. That is, the monitoring camera shown in FIG. 4 includes the zoom lens 30, focus lens 31, iris 32, CCD 33, amplifier 34, signal processor 35, mixer 36, interface 37, motor driver 38, microcomputer 39, mask generator 40, memory 41, keypad 42, and detector 43 shown in FIG. 3, and also includes the alarm module 44 and wireless communication module 45.

In this embodiment of the present invention, the detector 43 detects an object motion from a camera image signal-processed by the signal processor 35, and the microcomputer 39 monitors the movement position and movement direction of the detected object motion to thereby analyze the movement path of the object motion.

As the result of analysis, if the object motion comes near or within a predetermined distance from the mask image while moving toward the mask image synthesized on a specific region of the camera image, the microcomputer 39 operatively controls the alarm module 44 to output a warning sound, or operatively controls the wireless communication module 45 to generate a warning message. The warning message can also be output to an external communication device connected through a wireless communication network.

Figure 9:
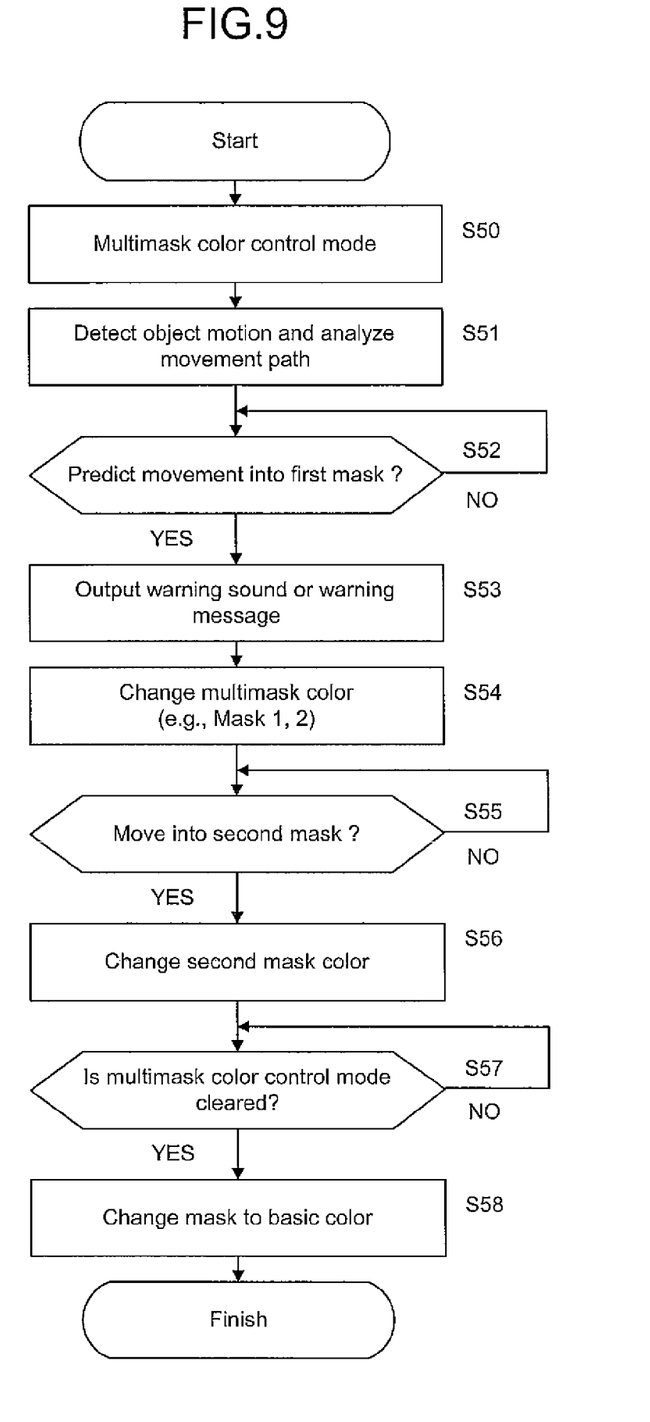
FIG. 9 is a flowchart illustrating a method for controlling a color of a mask of a monitoring camera according to a third embodiment of the present invention.

In more detail, FIG. 9 is a flowchart illustrating a method for controlling the color of a mask of a monitoring camera according to a third embodiment of the present invention. FIG. 8 will also be referred to in this description.

Figure 10:
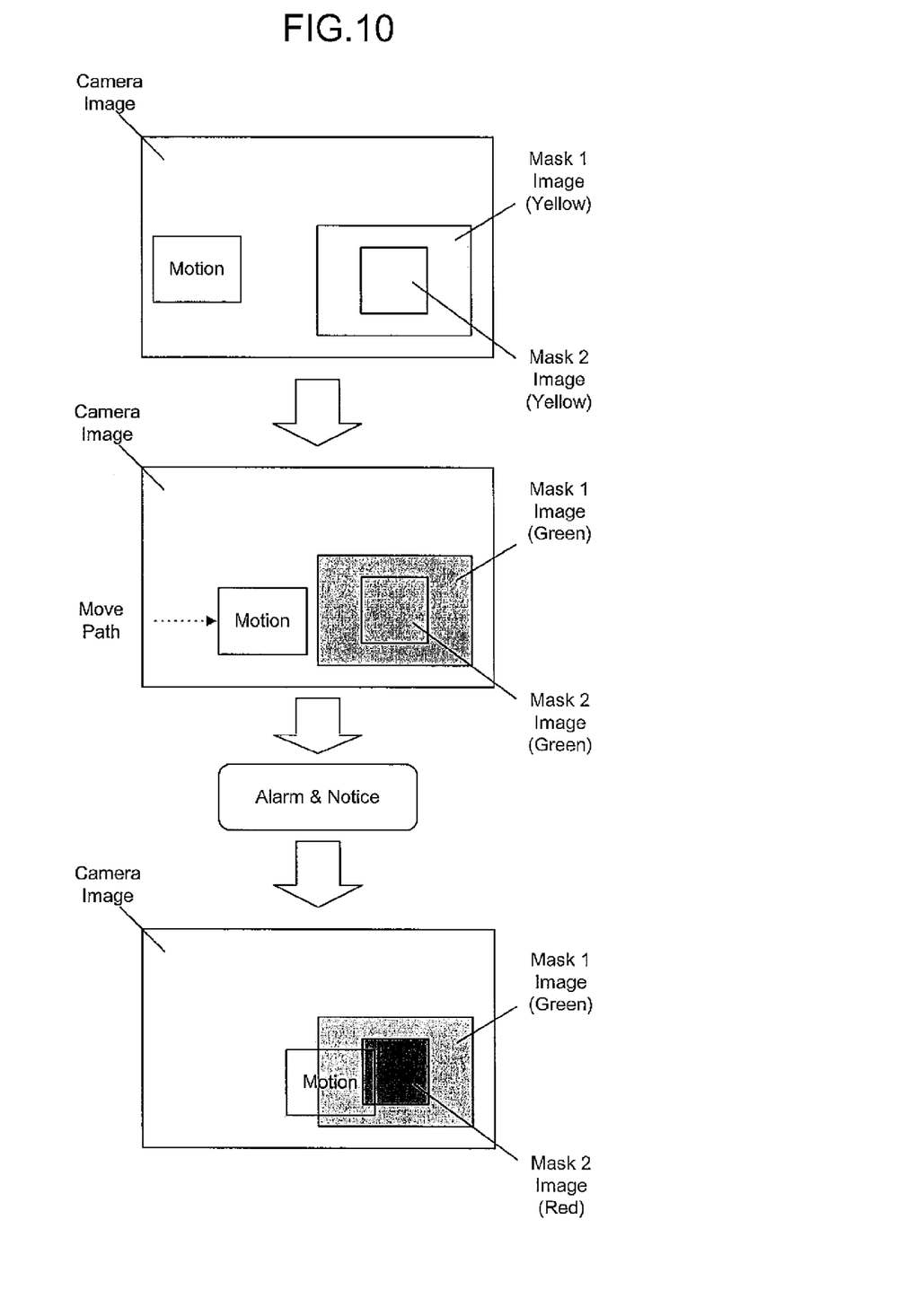
FIG. 10 is an overview illustrating changing a color of a mask according to the third embodiment of the present invention.

As shown in FIG. 9, the microcomputer 39 sets, for example, a multi-mask color control mode according to a user's request or the like (S50). For example, the microcomputer 39 operatively controls the mask generator 40 to synthesize a first mask image of a large size and a second mask image of a small size on a camera image as illustrated in FIG. 10.

The detector 43 then receives a camera image signal output through the signal processor 35 and detects a motion of an object which has moved. For example, a current video frame (n) in which an image signal is processed in real time and a video frame (n-1) in which an image signal has been previously processed are compared with each other to output a region in which an object motion is detected to the microcomputer 39.

In addition, the microcomputer 39 monitors the movement position and movement direction of the object motion to thereby analyze the movement path of the object motion (S51). For example, as shown in FIG. 10, if the object motion comes close or within a predetermined distance from the first mask image while moving toward the first mask image, the microcomputer 39 predicts that the object motion will move into the first mask image (Yes in S52).

Once the prediction is made, or the object motion moves into the first mask image, the microcomputer 39 operatively controls the alarm module 44 and the wireless communication module 45 to output a warning sound or warning message (S53). For example, the microcomputer 39 operatively controls the alarm module 44 to output a warning sound so that people positioned around the monitoring camera can hear the warning sound, or operatively controls the wireless communication module 45 to generate a warning message and then output the message to an external communication device connected to a wireless communication network or the like so that a specific user can check the warning message through the external communication device.

Further, the alarm module 44 can output a first warning sound or warning message when the object moves into an area defined by the first mask image and output a second warning sound or warning message that is different than the first warning sound or warning message such that the user can easily determine which area the object has moved into. The second warning sound or signal can also be more severe if the area defined by the second image area is designated by a user as being a more secure area than the area defined by the first image mask.

Then, the microcomputer 39 operatively controls the mask generator 40 to change the colors of the first and second mask images to colors different from the previous colors (S54). Moreover, the microcomputer 39 monitors whether the region in which the object motion is detected moves into the second mask image, and as the result of monitoring, if the object moves into the second mask image (Yes in S55), the microcomputer 39 operatively controls the mask generator 40 to change one or more of the colors of the first mask image and second mask image (S56).

For instance, as shown in FIG. 10, with the colors of both of the first and second mask images changed to green, if the object moves into the second mask image, the color of the second mask image only is changed from green to red, thereby allowing the user to easily recognize that the object motion has moved into the second mask image.

Also, if the microcomputer 39 clears the multi-mask color control mode according to the user' request (Yes in S57), the colors of the first mask image and second mask image are changed to a previously set basic color (e.g., yellow) (S58).

Further, the memory 41 may includes mask color table information that includes a relationship between mask colors and corresponding brightness values of camera images. For example, the mask colors and the corresponding brightness values of the camera images can be linked to one another in a one-to-one correspondence.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling a monitoring camera in a mask color control mode, the method comprising:
   determining an average brightness of a camera image captured by the monitoring camera;
   selecting mask colors from a mask color table corresponding to the average brightness of the camera image;
   generating first and second masks of different sizes using a first mask color, the first mask having a larger area and surrounding the second mask;
   overlapping the first and second masks on a specific region of the camera image;
   detecting a motion of an object from the camera image; and
   changing the first mask color of the first and second masks on the camera image into a second mask color, when the object is detected to move into an area inside the first mask and outside the second mask and changing the second mask color of only the second mask into a third mask color when the object is detected to move into an area defined by the second mask; and
   changing back the mask colors to the first mask color, when the mask color control mode is cleared.

2. The method according to claim 1, further comprising:
   analyzing a movement path of the object; and
   outputting a warning sound or warning message based on the analyzed movement path of the object.

3. The method according to claim 2, wherein the step of analyzing comprises monitoring and analyzing a movement position and a movement direction of the object.

4. The method according to claim 2, wherein when the step of analyzing the movement path of the object detects that the object comes closer or within a predetermined distance from an area defined by the first mask while moving toward the first mask, the outputting step outputs the warning sound or warning message.

5. The method according to claim 2, wherein when the step of analyzing the movement path of the object detects that the object comes within the area inside the first mask and outside the second mask, the outputting step outputs a first warning sound or warning message, and when the step of analyzing the movement path of the object detects that the object comes within the area defined by the second mask, the outputting step outputs a second warning sound or warning message that is different from the first warning sound or message.

6. The method according to claim 2, wherein the step of outputting the warning sound or warning message outputs an alarm sound using an alarm module provided at the monitoring camera or outputs the warning message to an external communication device using a communication module provided at the monitoring camera.

7. An apparatus for controlling a monitoring camera in a mask color control mode, the apparatus comprising:
a detector configured to determine an average brightness of a camera image captured by the monitoring camera;
a microcomputer configured to select mask colors from a mask color table corresponding to the average brightness of the camera image;
a generating unit configured to generate first and second masks of different sizes using a first mask color, the first mask having a larger area and surrounding the second mask;
a synthesizing unit configured to overlap the first and second masks on a specific region of the camera image captured by the monitoring camera;
a detecting unit configured to detect a motion of an object from the camera image; and
a controlling unit configured to change the first mask color of the first and second masks on the camera image into a second mask color when the detecting unit detects that the object moves into an area inside the first mask and outside the second mask and to change the second mask color of only the second mask into a third mask color when the detecting unit detects that the object moves into an area defined by the second mask, and
the microcomputer further configured to change back the mask colors to the first mask color, when the mask color control mode is cleared.

8. The apparatus according to claim 7, further comprising:
an analyzing unit configured to analyze a movement path of the object; and
an outputting unit configured to output a warning sound or warning message based on the analyzed movement path of the object.

9. The apparatus according to claim 8, wherein the analyzing unit is further configured to monitor and analyze a movement position and a movement direction of the object.

10. The apparatus according to claim 8, wherein when the analyzing unit detects that the object comes closer or within a predetermined distance from an area defined by the first mask while moving toward the first mask, the outputting unit outputs the warning sound or warning message.

11. The apparatus according to claim 8, wherein when the analyzing unit detects that the object comes within the area inside the first mask and outside the second mask, the outputting unit outputs a first warning sound or warning message, and when the analyzing unit detects the object comes within the area defined by the second mask, the outputting unit outputs a second warning sound or warning message that is different from the first warning sound or message.

12. The apparatus according to claim 8, wherein the outputting unit comprises an alarm module provided at the monitoring camera for outputting the warning sound a communication module provided at the monitoring camera for outputting the warning message to an external communication device.

* * * * *